(12) United States Patent
Barbir et al.

(10) Patent No.: US 11,831,754 B2
(45) Date of Patent: Nov. 28, 2023

(54) SYSTEMS AND METHODS FOR DEVICE BINDING ACROSS MULTIPLE DOMAINS USING AN AUTHENTICATION DOMAIN

(71) Applicant: Aetna Inc., Hartford, CT (US)

(72) Inventors: Abbie Barbir, Ogdensburg, NY (US);
Salil Kumar Jain, Jackson Heights, NY (US); Cisa Kurian, Unionville, CT (US); John Poirier, Queen Creek, AZ (US); Amy Ulrich, Phoenix, AZ (US); Erick Verry, Fleming Island, FL (US); Victoria Garstka, Scottsdale, AZ (US); Abhishek Tennarangam, Hartford, CT (US)

(73) Assignee: Aetna Inc., Hartford, CT (US)

( * ) Notice: Subject to any disclaimer, the term of this patent is extended or adjusted under 35 U.S.C. 154(b) by 160 days.

(21) Appl. No.: 17/236,797

(22) Filed: Apr. 21, 2021

(65) Prior Publication Data
US 2022/0345297 A1 Oct. 27, 2022

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3213* (2013.01); *H04L 9/3271* (2013.01)

(58) Field of Classification Search
CPC ... H04L 9/0825; H04L 9/0866; H04L 9/3213; H04L 9/3271
USPC ......................................................... 713/171
See application file for complete search history.

(56) References Cited

U.S. PATENT DOCUMENTS

| | | | | |
|---|---|---|---|---|
| 11,012,238 B2* | 5/2021 | Meng | ................... | H04L 9/0897 |
| 2013/0173915 A1* | 7/2013 | Haulund | ................ | H04L 63/18 |
| | | | | 713/155 |
| 2013/0191884 A1* | 7/2013 | Leicher | ............... | H04W 12/069 |
| | | | | 726/4 |
| 2014/0230027 A1* | 8/2014 | Cha | ....................... | H04L 61/302 |
| | | | | 726/5 |
| 2018/0026983 A1 | 1/2018 | Jain et al. | | |
| 2019/0075102 A1* | 3/2019 | Kim | ....................... | H04L 63/08 |
| | | | (Continued) | |

OTHER PUBLICATIONS

"How FIDO Works" https://fidoalliance.org/how-fido-works/ (2021).

*Primary Examiner* — Moeen Khan
(74) *Attorney, Agent, or Firm* — Leydig, Voit & Mayer, Ltd.

(57) ABSTRACT

In some instances, a method for authenticating a user using key pair authentication is provided. The method comprises enrolling the user into key pair authentication by generating a private and public key pair for an authentication domain, accessing the content on the first domain based on enrolling the user into the key pair authentication with a key pair authentication server using the private and public key pair for the authentication domain, requesting access for different content on a second domain, based on enrolling the user into the key pair authentication for the first domain, redirecting a browser from the second domain to the authentication domain, and accessing the different content on the second domain based on performing the key pair authentication with the key pair authentication server using the private and public key pair for the authentication domain.

15 Claims, 8 Drawing Sheets

(56) References Cited

U.S. PATENT DOCUMENTS

2020/0145409 A1\* 5/2020 Pochuev ............... H04L 63/061
2020/0195630 A1\* 6/2020 Mallinson ........... H04W 12/068
2022/0303268 A1\* 9/2022 Karnaros ................ G06F 21/32

\* cited by examiner

500

SYSTEMS AND METHODS FOR DEVICE BINDING ACROSS MULTIPLE DOMAINS USING AN AUTHENTICATION DOMAIN

BACKGROUND

An organization such as an enterprise organization (e.g., company) may provide multiple different services that are hosted and/or operated on multiple different domains/servers. For instance, an organization may provide a first service such as a pharmacy service (e.g., prescription pick-up service) and a second service such as a grocery service (e.g., a grocery pick-up service). As compared to the grocery service, the pharmacy service may have drastically different procedures that are implemented so as to ensure the prescription for a particular user is accurate. In addition, other organizations may also provide additional services that are hosted by additional domains/servers.

Traditionally, to access content hosted on these different domains (e.g., request and pick-up a prescription), the user may use a user device to log-onto the domain by providing their user credentials such as a user identifier (ID) and password. Additionally, the user device may generate, create, and use a key pair (e.g., a public and private key) to bind the device with the domain. The key pair may be used to encrypt/decrypt information being sent to and being received from the particular domain. Each domain may have its own key pair for encrypting/decrypting the information. However, using multiple key pairs may be burdensome especially for the user as they have to register for a different account for each domain individually. Furthermore, each domain may require further authentication steps such as providing biometric authentications from the user and each added process may increase the burden on the user. Accordingly, there remains a technical need to bind a user device to multiple different domains.

SUMMARY

In some examples, the present application provides a method and system for device binding across multiple domains using an authentication domain. For example, a user may use a user device to request access for content on a first domain that is hosted and/or managed by a first system (e.g., a first authentication server). A system such as an authentication domain system may intercept the request and/or redirect the user device to an authentication domain that is hosted by an authentication domain system. The authentication domain system may check to see whether the user device has already enrolled into a key pair authentication with the server. If not, the authentication domain system may enroll the user device into the key pair authentication. For instance, the authentication domain system may request and the user device may provide a public key of a private and public key pair. The private and public key pair might not be associated solely with the first domain, but rather it may be associated with the authentication domain. Using the private and public key pair for the authentication domain, the user device may be granted access to content on the first domain.

Subsequently, the user device may request access for content on a second domain that is hosted and/or managed by a second system (e.g., the second authentication server). The authentication domain system may redirect the user device to the authentication domain and check to see whether the user device has enrolled into the key pair authentication. Due to the user device enrolling into the key pair authentication for the first domain, the authentication domain system may determine the user device has already enrolled into the key pair authentication. Therefore, the user device may be granted access to content on the second domain using the private and public key pair for the authentication domain. In other words, rather than creating a completely new private and public key pair for the second domain, the user device may be able to access content on the second domain using an already created private and public key pair. This already created private and public key pair may be generated when the user device requests access to content on the first domain and may further be for an authentication domain rather than an individual domain such as the first domain and/or the second domain.

In one aspect, a method for authenticating a user using key pair authentication is provided. The method comprises: in response to a user request requesting access to content on a first domain, enrolling, by a user device, the user into key pair authentication by generating a private and public key pair for an authentication domain; accessing the content on the first domain based on enrolling the user into the key pair authentication with a key pair authentication server using the private and public key pair for the authentication domain; requesting, by the user device, access for different content on a second domain; based on enrolling the user into the key pair authentication for the first domain, redirecting, by the user device, a browser from the second domain to the authentication domain; and accessing, by the user device, the different content on the second domain based on performing the key pair authentication with the key pair authentication server using the private and public key pair for the authentication domain.

Examples may include one of the following features, or any combination thereof. For instance, in some examples, the method further comprises: based on authenticating user credentials for the first domain, redirecting, by the user device, the browser from the first domain to the authentication domain.

In some instances, the key pair authentication server is a fast identity online (FIDO) server.

In some variations, the method further comprises: receiving, from a global identifier server, a global identifier based on the user request, wherein the user request comprises a user identifier; determining whether the received global identifier for the user is stored in the key pair authentication server; and based on the received global identifier not being stored in the key pair authentication server, providing user credentials to a first authentication server associated with the first domain.

In some examples, enrolling the user for the key pair authentication comprises: providing the global identifier to the key pair authentication server, wherein the key pair authentication server enrolls the user for key pair authentication based on the global identifier and the authentication domain.

In some instances, enrolling the user for key pair authentication further comprises: in response to providing the global identifier, receiving, by the user device, a challenge and allowed authenticators from the key pair authentication server; signing the challenge using the private and public key pair; and providing the signed challenge and a public key of the private and public key pair to the key pair authentication server, wherein the key pair authentication server associates and stores the global identifier, the authentication domain, and the public key together.

In some variations, the method further comprises: based on providing the signed challenge and the public key, receiving a signed JSON web token (JWT) from the key pair authentication server; and trading the signed JWT for a valid OpenID Connect (OIDC) token with a resource manager server, wherein the valid OIDC token is used to access the content on the first domain.

In some examples, the method further comprises: in response to requesting access for the different content on the second domain, receiving a global identifier associated with a user identifier; and determining whether the received global identifier for the user is stored in the key pair authentication server, and wherein redirecting the browser from the second domain to the authentication domain is based on determining the received global identifier is already stored in the key pair authentication server.

In some instances, accessing the different content on the second domain based on performing the key pair authentication with the key pair authentication server comprises: receiving a challenge and allowed authentications from the key pair authentication server; signing the challenge using the private and public key pair for the authentication domain; providing the signed challenge to the key pair authentication server, wherein the key pair authentication server validates the signed challenge with a stored public key associated with the authentication domain; and accessing the different content on the second domain based on the validation.

In some variations, accessing the different content based on the validation comprises: receiving a signed JSON web token (JWT) based on the key pair authentication server validating the signed challenge; and trading the signed JWT for a valid OpenID Connect (OIDC) token with a resource manager server, wherein the valid OIDC token is used to access the different content on the second domain.

In another aspect, a system for authenticating a user using key pair authentication is provided. The system comprises a global identifier server configured to provide a global identifier associated with the user based on a user request, from a user device, requesting access to content on a first domain. The system further comprises a key pair authentication server configured to: based on determining the global identifier associated with the user does not exist within the key pair authentication server, enroll the user in key pair authentication using the global identifier, an authentication domain, and a public key received from the user device, wherein the public key is from a private and public key pair for the authentication domain; based on enrolling the user in key pair authentication and in response to a second user request to request access to different content on a second domain, provide instructions to redirect the user device to the authentication domain; and perform the key pair authentication with the user device for the second domain using the public key from the private and public key pair for the authentication domain.

Examples may include one of the following features, or any combination thereof. For instance, in some examples, the key pair authentication server is a fast identity online (FIDO) server.

In some instances, the key pair authentication server is configured to enroll the user in the key pair authentication by: providing, to the user device, a challenge and allowed authenticators; receiving, from the user device, a signed challenge and the public key of the private and public key pair for the authentication domain; and associating the global identifier, the authentication domain, and the public key together.

In some variations, the signed challenge is a challenge that is signed by the user device using a private key of the private and public key pair for the authentication domain.

In some examples, the key pair authentication server provides the allowed authenticators by providing one or more biometric requests to the user device, wherein the biometric requests request a biometric marker associated with the user.

In some instances, the key pair authentication server is further configured to: based on enrolling the user in the key pair authentication, providing a signed JSON web token (JWT) for accessing the content on the first domain.

In some variations, the key pair authentication server is further configured to: based on performing the key pair authentication with the user device for the second domain using the public key from the private and public key pair for the authentication domain, providing a signed JSON web token (JWT) for accessing the different content on the second domain.

In yet another aspect, a user device is provided. The user device comprises one or more processors; and a non-transitory computer-readable medium having processor-executable instructions stored thereon. The processor-executable instructions, when executed, facilitate: in response to a user request requesting access to content on a first domain, enrolling the user into key pair authentication by generating a private and public key pair for an authentication domain; accessing the content on the first domain based on enrolling the user into the key pair authentication with a key pair authentication server using the private and public key pair for the authentication domain; requesting access for different content on a second domain; based on enrolling the user into the key pair authentication for the first domain, redirecting a browser from the second domain to the authentication domain; and accessing the different content on the second domain based on performing the key pair authentication with the key pair authentication server using the private and public key pair for the authentication domain.

Examples may include one of the following features, or any combination thereof. For instance, in some examples, the processor-executable instructions, when executed, further facilitate: based on authenticating user credentials for the first domain, redirecting, by the user device, the browser from the first domain to the authentication domain.

In some instances, the key pair authentication server is a fast identity online (FIDO) server.

All examples and features mentioned herein may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
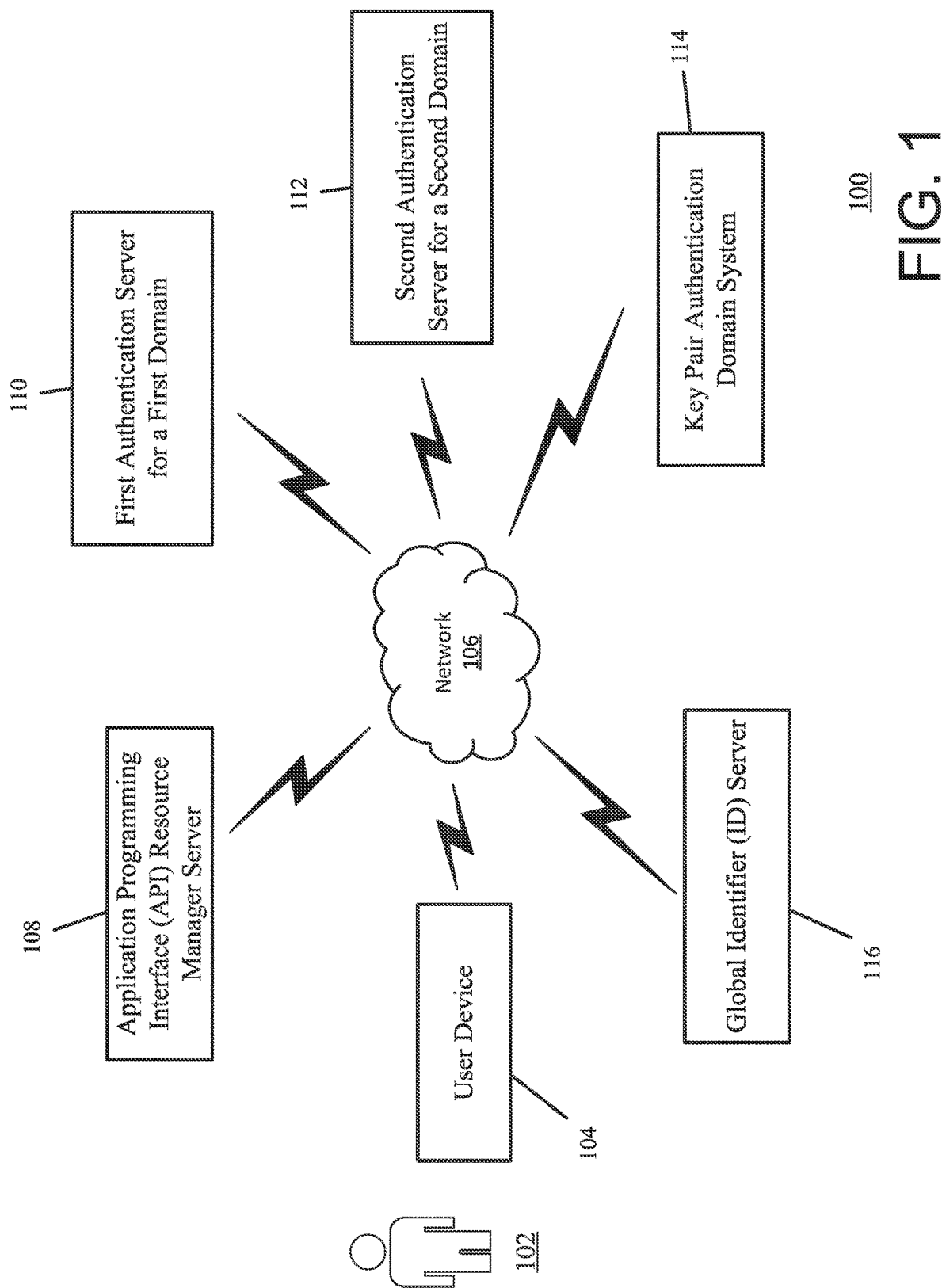
FIG. 1 is a simplified block diagram depicting an exemplary computing environment in accordance with one or more examples of the present application.

Systems, methods, and computer program products are herein disclosed that provide for device binding across multiple domains using an authentication domain. FIG. 1 is a simplified block diagram depicting an exemplary environment in accordance with an example of the present application. The environment 100 includes a user 102, a user device 104 (e.g., a computing device), a network 106, a first authentication server for a first domain 110, a second authentication server for a second domain 112, a key pair authentication domain system (authentication domain system) 114, and a global identifier (ID) server 116. Although the entities within environment 100 may be described below and/or depicted in the FIGS. as being singular entities, it will be appreciated that the entities and functionalities discussed herein may be implemented by and/or include one or more entities. For instance, the key pair authentication domain system 114 (system 114) may include a plurality of computing devices, systems, platforms, and/or servers that are spread across multiple different geographical locations and communicate with each other using direct connections and/or the network 106.

The entities within the environment 100 such as the user device 104 (e.g., a computing device), the network 106, the first authentication server for a first domain 110, the second authentication server for a second domain 112, the system 114, and the global ID server 116 may be in communication with other devices and/or systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

User 102 may operate, own, and/or otherwise be associated with the user device 104. For instance, the user 102 may be located in a particular location and may use the user device 104 to access content from a particular domain. The domain may be, include, and/or is associated with a uniform resource locator (URL), a webpage, an application, an application programming interface (API), and/or another content source or entity that is hosted by one or more servers, computing platforms, and/or computing systems. For instance, a first server (e.g., a first authentication server 110) may manage, host, and/or otherwise be associated with a first domain (e.g., first web page). The user 102 may use the user device 104 to access content on the first web page.

The user device 104 is and/or includes, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The user device 104 may be able to execute software applications and/or programs. Additionally, and/or alternatively, the user device 104 may be configured to operate a web browser to connect to a web page (e.g., the first domain name) and/or an application hosted and/or managed by a first authentication server 110, a second authentication server 112, and/or other servers/systems. For instance, the user 102 may use the user device 104 to request access to content on a web page and/or provide user credentials to gain access to the content from the web page (e.g., ordering groceries).

The application programming interface (API) resource manager server 108 assists the user device 104 in accessing content on multiple different domain names. For instance, the API resource manager server 108 may assist the user device 104 with interactions between multiple software and/or mixed hardware software intermediaries. In some instances, the API resource manager server 108 directs, assists, and/or otherwise facilitates communications between the user device 104 and other entities within the environment 100 including the first authentication server 110, the second authentication server 112, and/or the key pair authentication domain system 114. The API resource manager server 108 includes and/or is implemented using one or more computing devices, computing platforms, cloud computing platforms, systems, servers, and/or other apparatuses capable of facilitating communications between entities within the environment 100 (e.g., between the user device 104 and the first authentication server 110).

The first authentication server 110 is a computing system that hosts, operates, manages, and/or otherwise is associated with one or more web pages, programs, and/or applications. The first authentication server 110 includes and/or is implemented using one or more computing devices, computing platforms, cloud computing platforms, systems, servers, and/or other apparatuses capable of hosting and/or managing the web pages, programs, and/or applications. Further, the first authentication server 110 may authenticate a user's credentials to permit the user to access content on the first domain. In some variations, the content may be stored on the first authentication server 110. In other variations, the content may be stored on a different server and/or system.

In some instances, the first authentication server 110 may be owned, operated, and/or managed by an enterprise organization. The enterprise organization may be any type of corporation, company, organization, and/or other institution that provides one or more goods and/or services. For instance, the enterprise organization may provide multiple different services such as a grocery pick-up service, a prescription pick-up service (e.g., the enterprise organization may provide prescriptions/medications to the user 102), an insurance service (e.g., the enterprise organization may provide insurance to the user 102), a streaming service (e.g., the enterprise organization may provide for streaming videos, television shows, and so on to the user 102), and/or other services. The first authentication server 110 may provide one or more of these services for the enterprise organization. For instance, the user 102 may use the first domain name (e.g., a first URL and/or application) to access content on the first authentication server 110. The content may include the service that can be provided to the user 102. In some examples, the first authentication server 110 may request user credentials such as a user ID, password, biometric information, and/or other identifiers to ensure the user 102 is actually the user 102.

The second authentication server 112 is a computing system that hosts, operates, manages, and/or otherwise is associated with one or more web pages, programs, and/or applications. The second authentication server 112 includes and/or is implemented using one or more computing devices, computing platforms, cloud computing platforms, systems, servers, and/or other apparatuses capable of hosting and/or managing the web pages, programs, and/or applications. The second authentication server 112 may be associated with a second domain (e.g., a second URL and/or application). For instance, the second authentication server 112 may authenticate a user's credentials to permit the user to access content on the second domain. In some variations, the content may be stored on the second authentication server 112. In other variations, the content may be stored on a different server. In some examples, the second domain may provide a different service from the first domain. For example, the first domain may provide a grocery pick-up service whereas the second domain may provide a prescription pick-up service. In some instances, an enterprise organization may own and/or manage the first authentication server 110 and the second authentication server 112 as well as the first and the second domains. In other instances, two or more different enterprise organizations may own and/or manage the servers 110 and 112 as well as the first and second domains.

While the first authentication server 110 and the second authentication server 112 are shown as separate entities, in some instances, a singular server, computing platform, and/or system may authenticate the user's credentials for multiple different domains that provide multiple different services to the user 102 and/or other users. For instance, a computing system may perform the functionalities of the first authentication server 110 and the second authentication server 112 to authenticate the credentials of the user 102 such that the user 102 may access content on the first domain, the second domain, and/or additional domains.

The system 114 (e.g., a fast identity online (FIDO) system) is a computing system that manages and/or handles authentication using public key cryptography for one or more domains such as the first domain and the second domain. The system 114 includes and/or is implemented using one or more computing devices, computing platforms, cloud computing platforms, systems, servers, and/or other apparatuses capable of managing authentication for the domains. In some examples, the system 114 performs authentication with user devices (e.g., user device 104) such as by binding the user device to the multiple different domains.

In some instances, the system 114 hosts, manages, and/or is otherwise associated with an authentication domain. The user device 104 may use the authentication domain to perform device binding and/or enroll into the key pair authentication with the system 114. For instance, the user device 104 may generate a key pair (e.g., a public and private key pair) for the authentication domain and enroll into the key pair authentication the system 114 using the generated key pair. By enrolling into the key pair authentication for the authentication domain, the user device 104 may be granted access to content from the first domain, the second domain, and/or other domains. In other words, in some examples, instead of having the user device 104 enroll separately for each domain and creating a separate private and public key pair for each domain, the system 114 may enroll the user device 104 into the authentication domain. By enrolling the user device 104 into the authentication domain, the user device 104 may be able to log-in and gain access to content on the first domain, the second domain, and/or additional domains.

In some variations, the authentication domain and/or the key pair authentication domain system 114 may be associated with an enterprise organization. For example, as mentioned above, the first domain and the second domain may provide services for a particular enterprise organization. The enterprise organization may have an authentication domain that is hosted, managed, and/or is otherwise associated with the system 114. When requesting access to content on the first domain and/or the second domain, the system 114 may redirect the user device 104 to the authentication domain for the enterprise organization. The user device 104 may request and gain access to content on the first and/or second domain using the authentication domain associated with the enterprise organization.

In some variations, the system 114 may store the public key for the authentication domain within memory. For instance, after receiving the public key of the private and public key pair for enrolling into the authentication domain, the system 114 may associated the public key with other identifiers associated with the user 102 and/or the user device 104. For example, the system 114 may associated the public key with a global identifier and store the public key, the global identifier, and the association in memory. The stored public key may be used for authenticating the user device 104 for the first domain, the second domain, and/or other domains associated within the enterprise organization.

The global identifier (ID) server 116 is a computing system that manages global identifiers for a plurality of users. The global identifier is an identifier that defines a user (e.g., the user 102) within the environment 100. For example, the global identifier is a unique identifier that binds the individual across various relationships (e.g., various domains) within the services provided by the enterprise organization. As an example, a user (e.g., User A) may have a user name such as "userA" for a first domain (e.g., a first application) and the same user (e.g., User A) may have a user name such as "userA1" for a second domain (e.g., a second application). While the usernames and/or actual provided names for the user (e.g., "John" and "JOhn") may be different, the global ID for the user (e.g., User A) may be the same for both of these domains as well as other domains associated with the enterprise organization (e.g., the global ID for the user may be "123456789" for the user). The global identifier (ID) server 116 includes and/or is implemented using one or more computing devices, computing platforms, cloud computing platforms, systems, servers, and/or other apparatuses capable of storing and/or identifying users and/or user devices.

In some examples, the system 114 may retrieve a global identifier associated with the user 102 and/or the user device 104 based on the user device's request to access content for a domain such as the first domain. The system 114 may enroll the user device 104 and/or the user 102 into the authentication domain using the global identifier. This will be described in further detail below.

In some instances, the system 114 and/or other entities within the environment 100 may be implemented as engines, software functions, and/or applications. In other words, the functionalities of the system 114 and/or other entities may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. For example, in some variations, the functionalities of the system 114 may be separated into multiple different entities. For instance, the system 114 may have a first system (e.g., a first computing system and/or platform) that enrolls and/or authenticates the user device 104 for the different domains (e.g., the first and/or the second domains). The system 114 may further have a second, separate system (e.g., a second computing system and/or platform) that hosts, manages, and/or is otherwise associated with the authentication domain.

Figure 2:
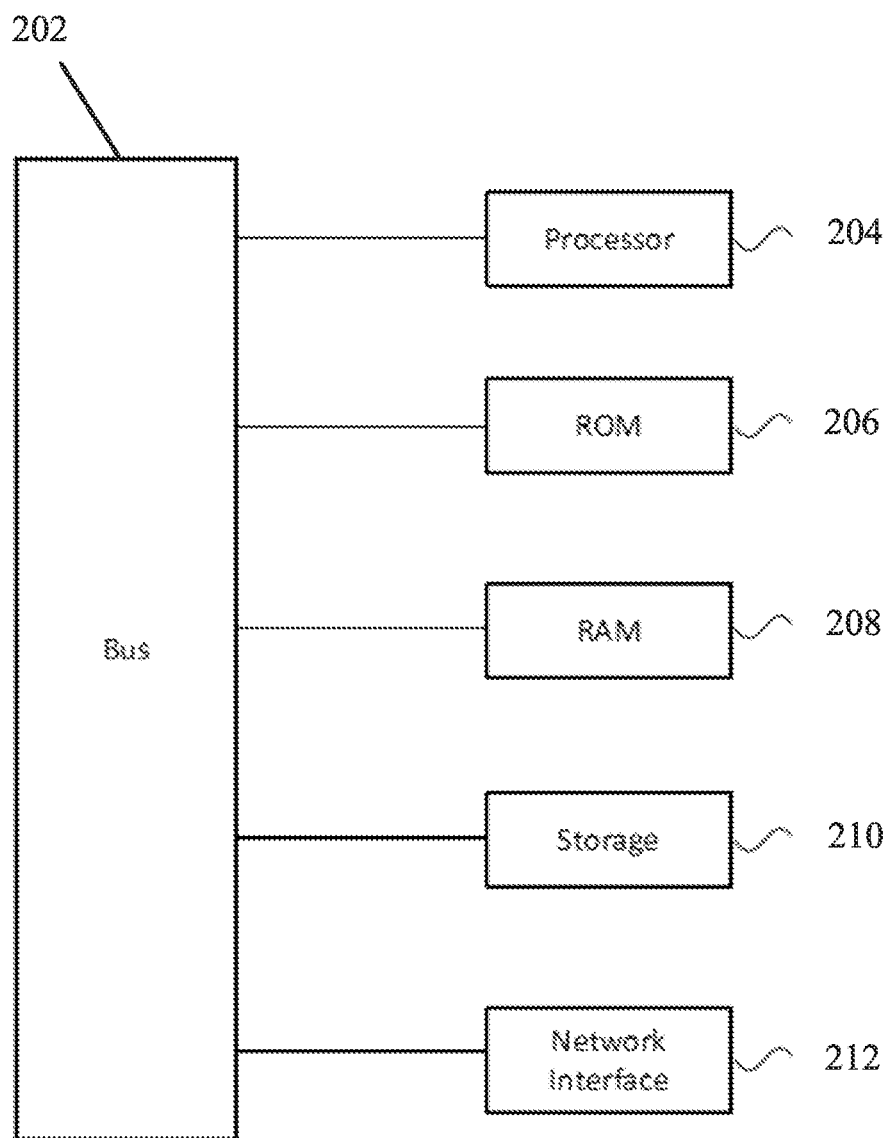
FIG. 2 is a simplified block diagram of one or more devices or systems within the exemplary environment of FIG. 1.

FIG. 2 is a block diagram of an exemplary system and/or device 200 (e.g., the user device 104, the first authentication server 110, the second authentication server 112, the authentication domain system 114, and the global ID server 116) within the environment 100. The device/system 200 includes one or more processors 204, such as one or more CPUs, controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3:
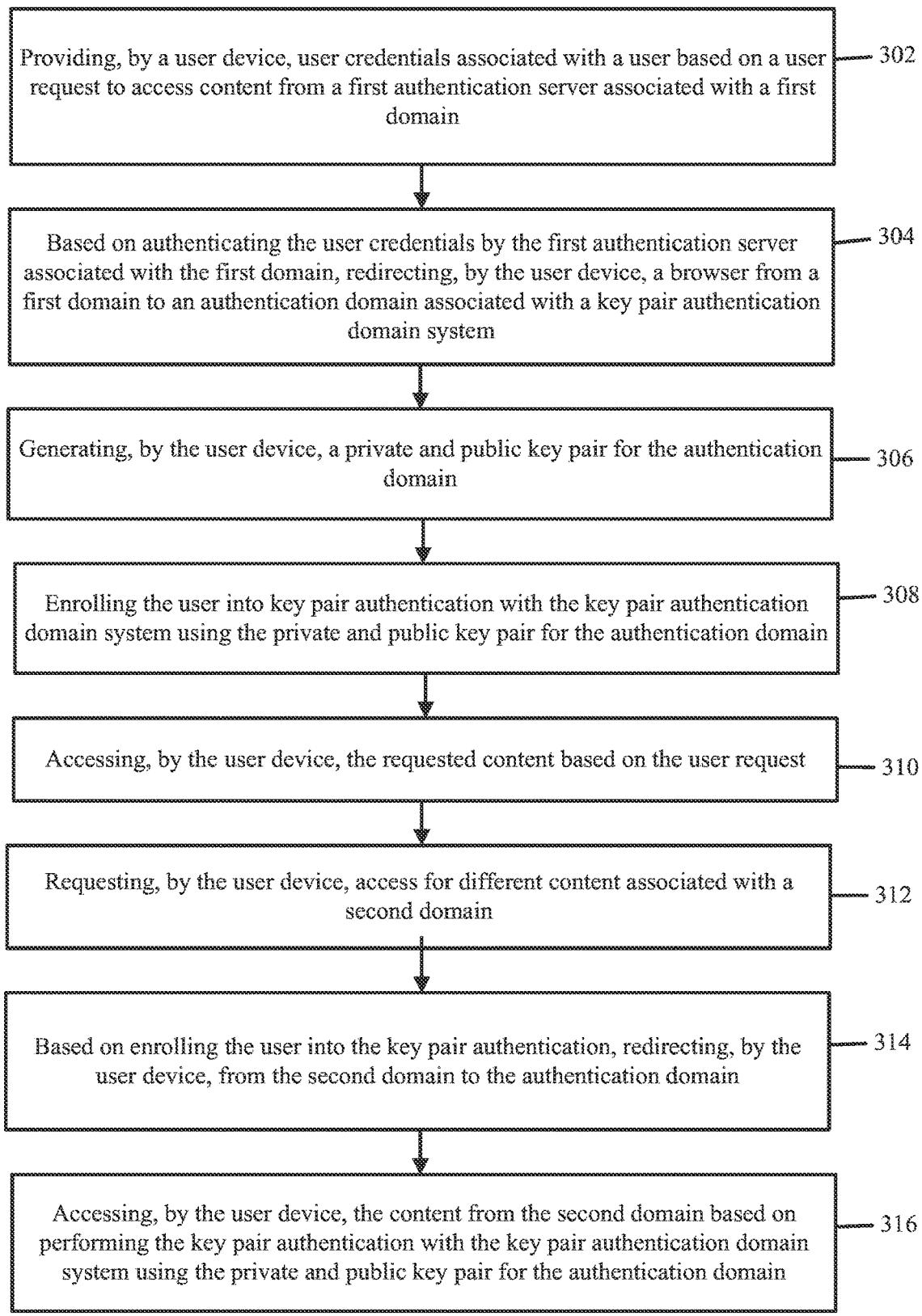
FIG. 3 is an exemplary process for device binding across multiple domains using an authentication domain in accordance with one or more examples of the present application.

FIG. 3 is an exemplary process 300 for device binding across multiple domains using an authentication domain in accordance with one or more examples of the present application. The process 300 may be performed by the user device 104 of environment 100 shown in FIG. 1. It will be recognized that any of the following blocks may be performed in any suitable order, and that the process 300 may be performed in any suitable environment. The descriptions, illustrations, and processes of FIG. 3 are merely exemplary and the process 300 may use other descriptions, illustrations, and processes for device binding across multiple domains using the authentication domain.

At block 302, the user device 104 provides user credentials associated with a user (e.g., user 102) based on a user request to access content from a first content server associated with a first domain (e.g., the first authentication server 110 for a first domain). For example, the enterprise organization may provide a first service (e.g., a grocery pick-up service) on a first domain (e.g., a first URL and/or application) and a second service (e.g., a prescription pick-up service) on a second domain (e.g., a second URL and/or application). The user 102 may access the first domain using a browser and/or another application operating on the user device 104. For instance, the user device 104 may provide a user request to access content on a first domain that is hosted and/or managed by a first authentication server 110. The first authentication server 110 may prompt the user 102 for user information such as the user identifier and/or other credentials of the user. The user 102, using the user device 104, may provide the user credentials to the API resource manager server 108. The API resource manager server 108 uses (e.g., passes) the first domain and the user information to the global ID server 116 to retrieve a global ID for the user 102. The global ID is a unique identifier that binds a user (e.g., user 102) across various relationships (e.g., various domains) within the services provided by the enterprise organization.

After, the API resource manager server 108 checks whether the global ID, the user information, and/or other information (e.g., a public key associated with an authentication domain) are stored within the system 114. If they are not stored within the system 114, the API resource manager server 108 prompts the user device 104 to enter a password and/or other identifiers (e.g., biometrics such as fingerprinting, quick response (QR) codes, and so on) associated with the user information and for the first domain. The API resource manager server 108 validates the user identifier with the first authentication server 110 to ensure the user identifier, password, and/or other identifiers properly identifies the user 102.

At block 304, based on authenticating the user credentials (e.g., the user identifier, password, and/or other identifiers) by the first authentication server 110, the user device 104 redirects the browser operating on the user device 104 from the first domain to an authentication domain associated with a key pair authentication domain system 114. For instance, the system 114 (e.g., a FIDO server) may authenticate user devices and/or users for a plurality of domains including the first domain associated with the first authentication server 110 and the second domain associated with the second authentication server 112. In other words, the first and second domains may validate user credentials that are issued for their own individual domains whereas the authentication domain may be used to validate the user 102 across multiple domains within the enterprise organization (e.g., the first and second domains as well as other domains). In some instances, the system 114 and/or the API resource manager server 108 may provide instructions to redirect the browser operating on the user device 104 to the authentication domain.

At block 306, the user device 104 generates a private and public key pair for the authentication domain. The private and public key pair may be part of a public key infrastructure (PKI) and/or used to encrypt and/or decrypt communications between the user device 104 and another entity such as the system 114 and/or the first authentication server 110. Rather than the private and public key pair being associated with the first domain (or another domain), the user device 104 may generate a private and public key pair for the authentication domain associated with the system 114. The user 102/the user device 104 may use the private and public key pair for the authentication domain for multiple domains associated with the enterprise organization.

At block 308, the user device 104 enrolls the user 102 into key pair authentication with the system 114 using the private and public key pair for the authentication domain. For instance, the system 114 may obtain a global ID associated with the user 102 (e.g., the global ID from the global ID server 116) and/or a public key. The public key may be part of the private and public key pair and may be for the authentication domain. The system 114 may store the obtained information (e.g., the global ID and/or the public key) within memory.

Additionally, and/or alternatively, in the enrolling process, the system 114 may provide a challenge and an authenticator list to the user device 104. The user device 104 may use the private and public key pair to sign the challenge and provide the signed challenge with the public key to the system 114. The system 114 may store the public key and verify the signed challenge is correct. For instance, the authenticator list may include, but is not limited to, one or more biometric and/or other identifiers for identifying the user 102 and/or the user device 104. For example, the authentication list may include a facial identification, a touch identifier (e.g., a fingerprint identification), a pin code identification (e.g., receiving/entering a pin code), a retinal identification (e.g., an iris scan), and/or other identifiers that are used to identify the user 102. A challenge may be a random string that is signed by the client and verified by the system 114 using the attached public key prior to saving the public key as a valid key for the user 102 being enrolled.

At block 310, the user device 104 accesses the requested content based on the user request. For example, based on the user request from block 302 and based on enrolling the user device 104 into key pair authentication with the system 114, the user device 104 may be granted access to the requested content. The content may be for the first domain and may be stored on the first authentication server 110 and/or another server associated with the first domain.

In other words, the user 102, using the user device 104, may direct a browser to a first domain such as a grocery pick-up service. Initially, the user 102 might not be enrolled in the authentication domain. Therefore, in order to log-onto and access content (e.g., order the groceries), the user device 104 may provide user credentials to the first domain and the first domain may authenticate the user 102. Furthermore, the user device 104 may be re-directed from the first domain to an authentication domain associated with the system 114 and the authentication domain may be used to enroll the user device 104 into key pair authentication. For instance, the system 114 may request information (e.g., challenges and/or authentication lists) to perform device binding between the user device 104 and the authentication domain. The requested information may be and/or include a public key generated by the user device 104 and the system 114 may bind the user device 104 using a global ID associated with the user 102 and the public key. After enrollment, the system 114 may grant access to the user device 104 and the user device 104 may be able to access content (e.g., schedule delivery of groceries) using the first domain. Then, as will be explained below, after binding the global ID with the public key and when the user 102 seeks to access a second domain, the binding with the global ID is recognized and the user 102 does not need to authenticate with the second domain, but rather authenticates with the authentication domain in order to access content from the second domain.

At block 312, the user device 104 requests access for different content associated with a second domain. For instance, the second domain may be hosted and/or managed by the second authentication server 112. In some instances, the second domain and the first domain may both belong to a single enterprise organization. For example, the first domain may be for grocery pick-ups and the second domain may be for prescription pick-ups. At block 312, the user device 104 may request access to the second domain in order to pick up their prescriptions. In some instances, the request may include a user ID associated with the user 102 for the second domain.

In some instances, the user device 104 may request access for the different content on the second domain by providing their user identifier to the API resource manager server 108. The API resource manager server 108 may use the second domain and the user identifier to retrieve a global ID from the global ID server 116. The API resource manager server 108 may pass the global ID to the authentication domain system 114 to determine whether the user 102 and/or the user device 104 has already enrolled in key pair authentication with the system 114.

At block 314, based on enrolling the user 102 into the key pair authentication (e.g., at block 308), the user device 104 redirects the browser from the second domain to the authentication domain. For example, the API resource manager server 108 and/or the system 114 may provide instructions to redirect the user device 104 to the authentication domain associated with the system 114. The authentication domain may prompt the user 102 to enter their credentials on the browser of the user device 104.

At block 316, the user device 104 accesses the content from the second domain based on performing the key pair authentication with the key pair authentication domain system 114 using the private and public key pair for the authentication domain. For example, due to the user device 104 enrolling into the key pair authentication with the system 114 when the user device 104 was attempting to access content on the first domain, the user device 104 may access content on the second domain without having to re-enroll into key pair authentication. For instance, rather than re-enrolling and having to provide further user information, the system 114 may already have the public key for the authentication domain from the user device 104. Accordingly, the user device 104 might not generate a new private and public key pair when attempting to access content on the second domain and instead may use the previously generated private and public key pair for the authentication domain (e.g., at block 306) to authenticate itself and gain access to content on the second domain. As such, the user device 104 may enroll into the authentication domain once and generate one public and private key pair for the authentication domain. Using this enrollment and public and private key pair for the authentication domain, the user device 104 may gain access to multiple different domains including the first domain associated with the first authentication server 110 and the second domain associated with the second authentication server 112. As such, the process may be streamlined such that the user device 104 and/or another entity (e.g., an entity storing a digital wallet for the user 102 and/or the user device 104) may store a single public and private key pair for numerous domains rather than storing a public and private key pair for each of the different domains.

In some instances, similar to above, the system 114 may authenticate and/or validate the user device 104 by sending a challenge and an authenticator list. The user device 104 may sign the challenge using the private key of the private and public key pair and provide the public key to the system 114. The system 114 may verify the challenge is correct using the public key. Based on the authentication, the user device 104 may be able to access content on the second domain such as picking up their prescription.

Figure 4:
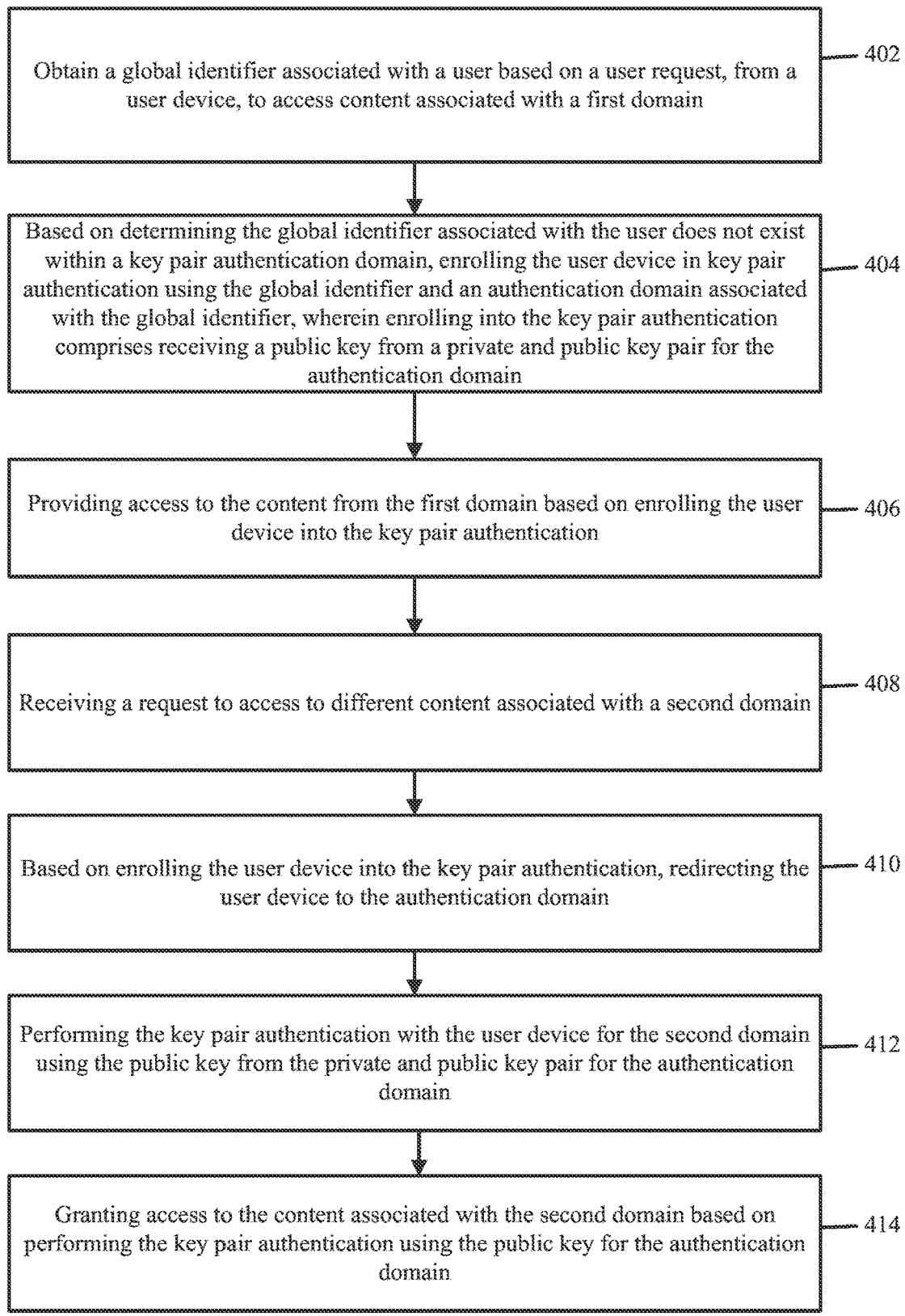
FIG. 4 is another exemplary process for device binding across multiple domains using an authentication domain in accordance with one or more examples of the present application.

FIG. 4 is an exemplary process 400 for device binding across multiple domains using an authentication domain in accordance with one or more examples of the present application. The process 400 may be performed by the key pair authentication domain system 114, the global ID server 116, and/or other entities of environment 100 shown in FIG. 1. It will be recognized that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for device binding across multiple domains using the authentication domain.

In some instances, the process 400 may be similar to process 300 except process 400 may be from the perspective of the back-end servers and systems (e.g., the system 114) of environment 100. For example, in operation, at block 402, the system 114 obtains a global ID associated with a user (e.g., user 102) based on a user request, from a user device (e.g., device 104), to access content associated with a first domain. For example, after the user device 104 provides a request to access content for a first domain, the API resource manager server 108 may retrieve a global ID associated with the user 102 from the global ID server 116 and provide the global ID to the system 114.

At block 404, based on determining the global ID associated with the user does not exist within the key pair authentication domain system 114, the system 114 enrolls the user device 104 in key pair authentication using the global identifier and an authentication domain associated with the global identifier. In some instances, enrolling the user device 104 into the key pair authentication includes the system 114 receiving a public key from a private and public key pair for the authentication domain. For example, the system 114 may determine whether the global ID associated with the user 102 and/or a public key for the authentication domain is stored within the system 114. Based on the global ID and/or the public key not existing within the system 114, the system 114 may prompt the user device 104 to provide user credentials as well as a public key of a public and private key pair for the authentication domain. Based on the prompt, the user device 104 may provide the user credentials and generate a public and private key pair for the authentication domain. The user device 104 may provide the public key of the key pair to the system 114. The system 114 may store the global ID as well as the public key for the authentication domain in memory (e.g., a database) such that when the user device 104 seeks to access content on the first domain and/or another domain (e.g., the second domain), the user device 104 is not required to re-enroll into the key pair authentication with the authentication domain.

At block 406, the system 114 may provide access to the content from the first domain based on enrolling the user device into the key pair authentication.

At block 408, the system 114 and/or another device (e.g., the API resource manager server 108) may receive a request to access different content associated with a second domain. For example, the API resource manager server 108 may receive a request to access content on a second domain and may provide the request and/or other information to the system 114.

At block 410, based on enrolling the user device 104 into the key pair authentication, the system 114 redirects the user device 104 to the authentication domain. For instance, the system 114 may provide instructions directing the user device to the authentication domain.

At block 412, the system 114 performs the key pair authentication with the user device 104 for the second domain using the public key from the private and public key pair for the authentication domain.

At block 414, the system 114 grants access to the content associated with the second domain based on performing the key pair authentication using the public key for the authentication domain.

For instance, rather than prompting the user device 104 to generate a new private and public key pair for the second domain. The system 114 may perform the key pair authentication for the second domain using the already generated private and public key pair when the user device 104 requested content on the first domain. In other words, since the user device 104 already generated a private and public key pair for the authentication domain, the system 114 and the user device 104 may use the private and public key pair for the authentication domain and the user device 104 does not need to generate a new private and public key pair for the second domain. As such, the process is streamlined as a private and public key pair for the authentication domain may grant the user device 104 access to content on multiple different domains.

In some examples, the authentication domain and/or the system 114 may be associated with domains other than the first and the second domains. For instance, the enterprise organization may further provide a streaming service on a third domain. Based on enrolling into the authentication domain for the first domain, the system 114 may use the private and public key pair for the authentication domain to authenticate the user device 104 for the third domain and/or additional/alternative domains.

FIGS. 5A-5D show an exemplary event sequence 500 for device binding across multiple domains using an authentication domain in accordance with one or more examples of the present application. However, the event sequence 500 is merely an example and other types of event sequences are contemplated herein including by performing any of the following blocks in any suitable order.

Figure 5A:
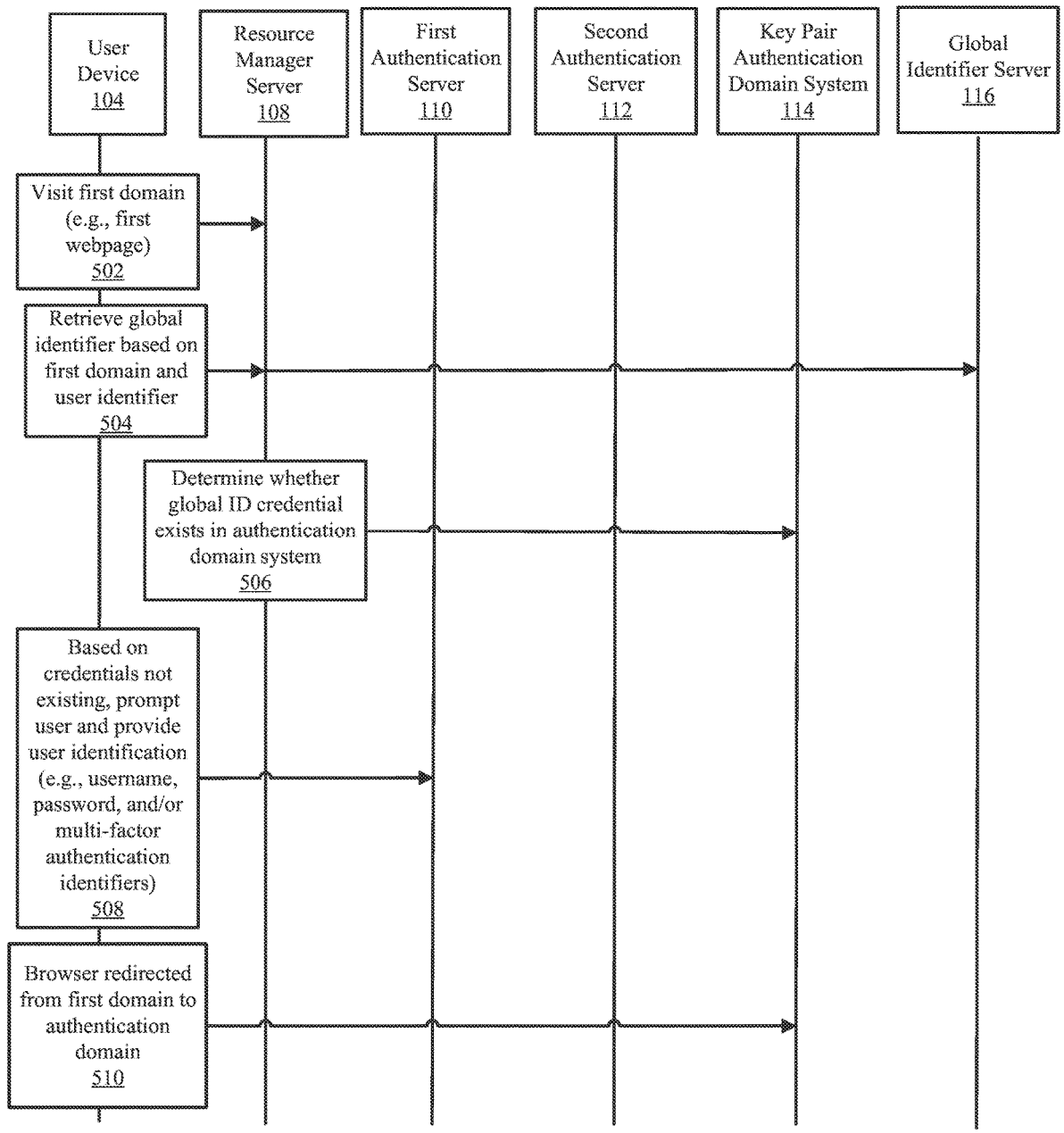
FIGS. 5A-5D show an exemplary event sequence for device binding across multiple domains using an authentication domain in accordance with one or more examples of the present application.

Referring to FIG. 5A, at block 502, the user device 104 visits a first domain (e.g., a first web page). For example, the user 102 may operate a browser on the user device 104 to visit a first domain such as a domain providing a grocery pick-up service. The user device 104 may communicate and/or provide data (data packets) to the resource manager server 108 so as to visit the first domain.

At block 504, the user device 104 retrieves a global identifier from the global identifier server 116 based on the first domain and the user identifier. For instance, the user device 104 provides instructions to the resource manager server 108. The resource manager server 108 obtains the global ID for the user device 104/user 102 from the global identifier server 116.

At block 506, the resource manager server 108 determines whether the global ID credential exists in the key pair authentication domain system 114.

At block 508, based on the credentials not existing, the user device 104 prompts the user 102 to provide user identification (e.g., username, password, and/or multi-factor authentication identifiers such as voice identification, fingerprint identification, and/or QR code scanning) Then, the user device 104 provides the user identification to the first authentication server 110.

At block 510, the browser operating on the user device 104 is redirected from the first domain to the authentication domain associated with the key pair authentication domain system 114. For instance, the system 114 and/or the resource manager server 108 may provide instructions to and/or communicate with the user device 104 to redirect the user device 104 to the authentication domain.

Figure 5B:
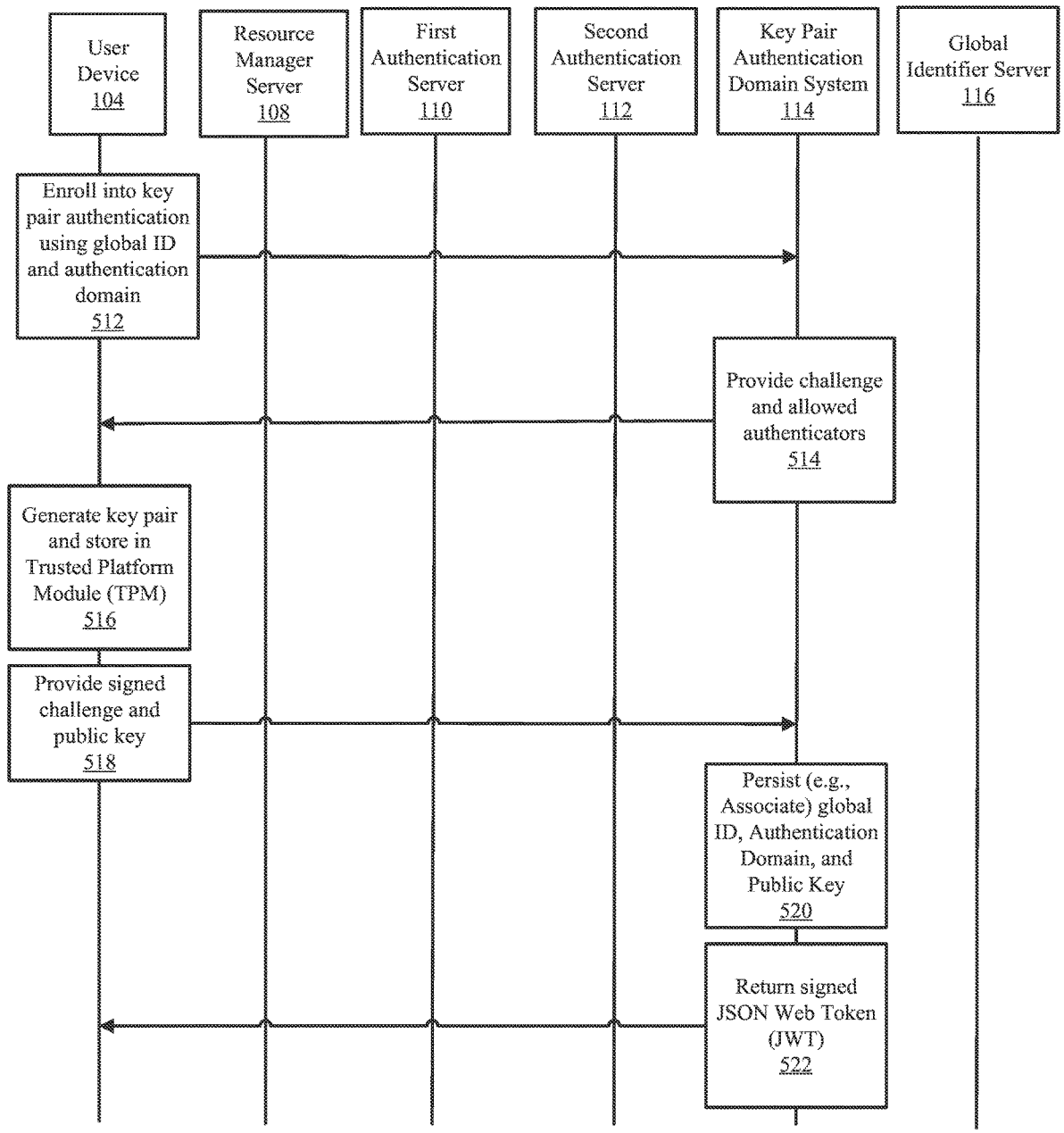

Referring to FIG. 5B, at block 512, the user device 104 communicates with the system 114 to enroll into key pair authentication using the global ID and the authentication domain.

At block 514, the system 114 provides a challenge and allowed authenticators to the user device 104 in order to enroll the user device 104 into key pair authentication.

At block 516, the user device 104 generates a key pair (e.g., a private and public key) and stores them in a trusted platform module (TPM). The TPM is a secure crypto processor and/or dedicated microcontroller designed to secure hardware through integrated cryptographic keys.

At block 518, the user device 104 provides a signed challenge and the public key to the system 114.

At block 520, the system 114 persists (e.g., associates) the global ID, the authentication domain, and the public key so as to perform device binding on the user device 104.

At block 522, the system 114 returns a signed JAVASCRIPT Object Notation (JSON) web token (JWT) to the user device 104. The JWT may be proof that the user 102 successfully completed authentication and is able to access the requested content.

Figure 5C:
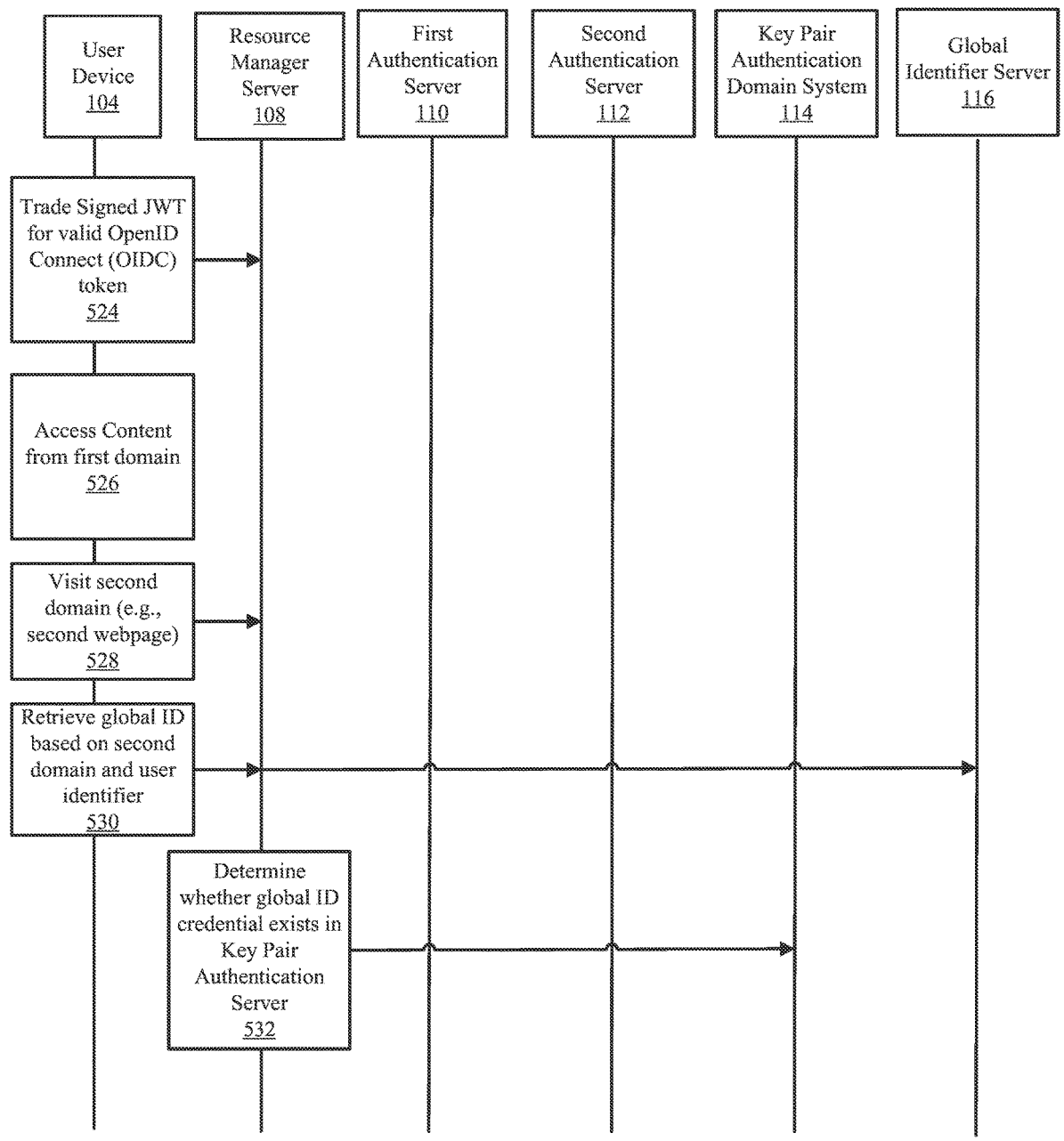

Referring to FIG. 5C, at block 524, the user device 104 trades the signed JWT for a valid Open Identifier (OpenID) Connect (OIDC) token. For instance, the JWT token may be traded to get access tokens (e.g., the OIDC token) from the resource manager server 108, which may be used to actually access the requested content.

At block 526, the user device 104 accesses content from the first domain using the OIDC. The OIDC token permits the application or other resource on the first domain to call the resource manager server 108 and request information on behalf of the authenticated user 102.

At block 528, the user device 104 visits a second domain (e.g., a second webpage).

At block 530, the user device 104 retrieves a global identifier from the global identifier server 116 based on the second domain and the user identifier. For instance, the user device 104 provides instructions to the resource manager server 108. The resource manager server 108 obtains the global ID for the user 102 from the global identifier server 116.

At block 532, the resource manager server 108 determines whether the global ID credential exists in the key pair authentication domain system 114.

Figure 5D:
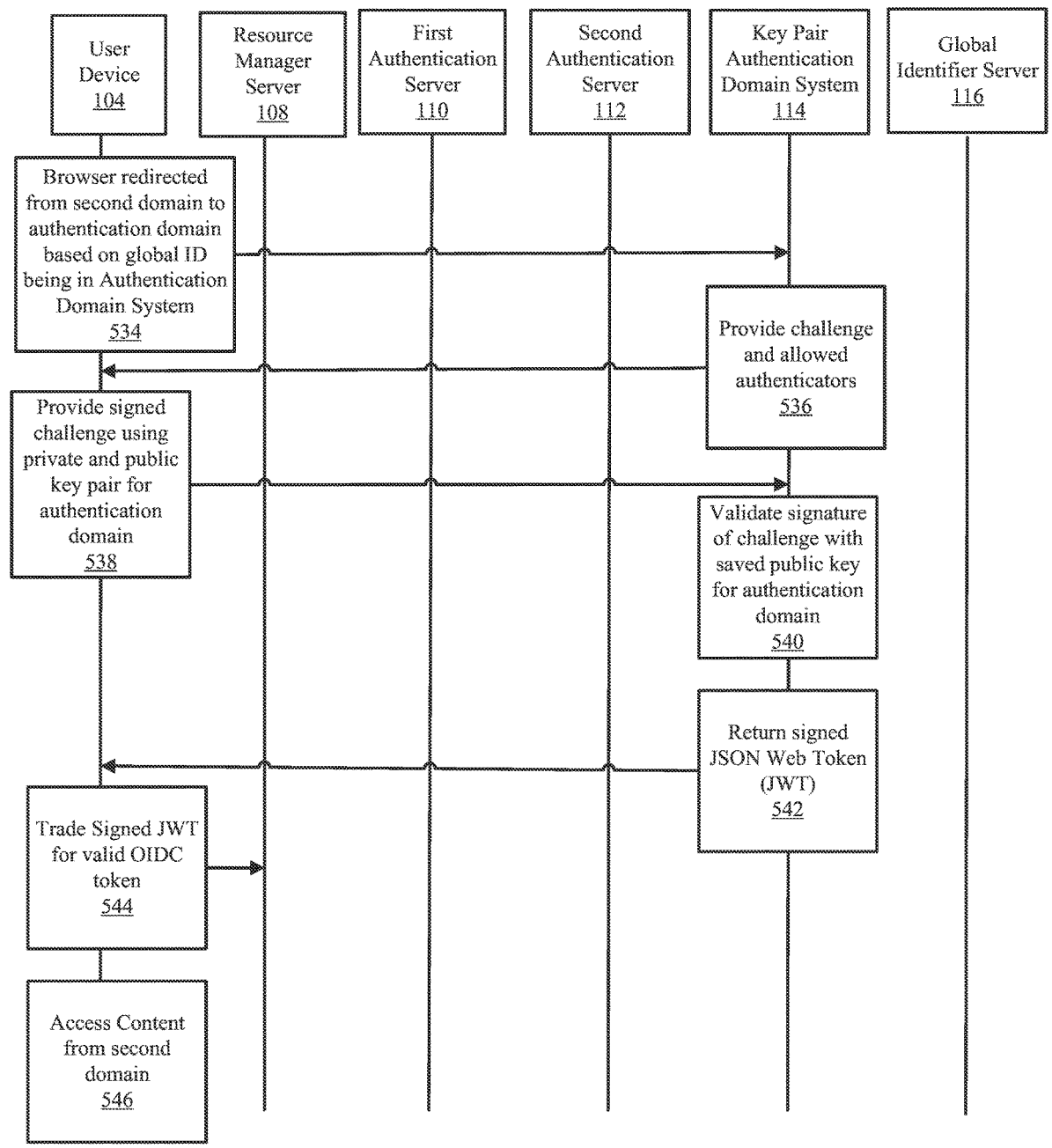

Referring to FIG. 5D, at block 534, the browser operating on the user device 104 is redirected from the second domain to the authentication domain associated with the key pair authentication domain system 114. For instance, the system 114 and/or the resource manager server 108 may provide instructions to the user device 104 to redirect the user device 104 to the authentication domain.

At block 536, the system 114 provides a challenge and allowed authenticators to the user device 104.

At block 538, the user device 104 provides a signed challenge using the private and public key pair for the authentication domain. In other words, rather than generating a new private and public key pair for the second domain, the user device 104 uses the previously generated private and public key pair to sign the challenge. Then, the user device 104 provides the signed challenge to the system 114.

At block 540, the system 114 validates the signature of the challenge with the saved public key for the authentication domain. In other words, the system 114 validates the signature of the challenge based on the public key that was previous stored when the user 102 was attempting to access content on the first domain.

At block 542, the system 114 returns a signed JWT to the user device 104.

At block 544, the user device 104 trades the signed JWT for a valid OIDC token with the resource manager server 108.

At block 546, the user device 104 accesses content from the second domain using the valid OIDC token.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method for authenticating a user using key pair authentication, comprising:
   in response to a user request requesting access to content on a first domain, receiving, from a global identifier server and by a user device, a global identifier based on the user request, wherein the user request comprises a user identifier;
   providing, by the user device, the global identifier to a key pair authentication server;
   enrolling, by the user device, the user into key pair authentication in response to determining that the global identifier associated with the user does not exist within the key pair authentication server, wherein the enrolling comprises:
      after redirecting the user device from the first domain to an authentication domain, generating a public-private key pair for the authentication domain;
      signing a challenge for the key pair authentication server using a private key of the public-private key pair to obtain a signed challenge;
      providing the signed challenge and a public key of the public-private key pair to the key pair authentication server, wherein the user is enrolled into the key pair authentication based on the signed challenge and binding the public key of the public-private key pair with the global identifier, and wherein the key pair authentication server validates the signed challenge using the public key of the public-private key pair and stores the public key as a valid key;
   receiving, by the user device, a signed JSON web token (JWT) from the key pair authentication server;
   accessing, by the user device, the content on the first domain based on enrolling the user into the key pair authentication and trading the signed JWT for a valid OpenID Connect (OIDC) token with a resource manager server, wherein the valid OIDC token is used to access the content on the first domain;
   requesting, by the user device, access for a different content on a second domain;
   in response to the requesting access for the different content on the second domain, receiving, from the global identifier server and by the user device, the global identifier;
   in response to determining that the public key was bound to the global identifier during the enrollment of the user into the key pair authentication for the first domain, redirecting, by the user device, a browser from the second domain to the authentication domain; and
   accessing, by the user device, the different content on the second domain based on performing the key pair authentication with the key pair authentication server using the public-private key pair for the authentication domain.

2. The method of claim 1, wherein redirecting the user device from the first domain to the authentication domain further comprises:
   based on authenticating user credentials for the first domain, redirecting, by the user device, the browser from the first domain to the authentication domain.

3. The method of claim 1, wherein the key pair authentication server is a fast identity online (FIDO) server.

4. The method of claim 1, further comprising:
   determining whether the received global identifier for the user is stored in the key pair authentication server; and
   based on the received global identifier not being stored in the key pair authentication server, providing user credentials to a first authentication server associated with the first domain.

5. The method of claim 1, wherein enrolling the user for the key pair authentication further comprises:
   based on generating the private and public key pair, receiving, by the user device, lithe challenge and allowed authenticators from the key pair authentication server;
   wherein the key pair authentication server binds the public key with the global identifier based on associating and storing the global identifier, the authentication domain, and the public key together.

6. The method of claim 1, wherein accessing the different content on the second domain based on performing the key pair authentication with the key pair authentication server comprises:
   receiving a second challenge and allowed authentications from the key pair authentication server;
   signing the second challenge using the public-private key pair for the authentication domain to obtain a signed second challenge;
   providing the signed second challenge to the key pair authentication server, wherein the key pair authentication server validates the signed second challenge with the public key of the public-private key pair associated with the authentication domain; and
   accessing the different content on the second domain based on the validation.

7. The method of claim 6, wherein accessing the different content based on the validation comprises:
   receiving a second signed JSON web token (JWT) based on the key pair authentication server validating the signed second challenge; and
   trading the signed second JWT for a second valid OpenID Connect (OIDC) token with the resource manager server, wherein the second valid OIDC token is used to access the different content on the second domain.

8. The method of claim 1, wherein the user request requesting access to the content on the first domain further comprises a first user identifier for the first domain,
   wherein requesting access for the different content on the second domain further comprises providing a second user identifier for the second domain, and
   wherein the first user identifier is different from the second user identifier.

9. A system for authenticating a user using key pair authentication, the system comprising:
   a global identifier server comprising:
      one or more first processors; and
      a first non-transitory computer-readable medium having first processor-executable instructions stored thereon, wherein the first processor-executable instructions, when executed by the one or more first processors, facilitate:
         in response to a first user request from a user device requesting access to content on a first domain, providing a global identifier associated with the user;
         in response to a second user request from the user device requesting access to different content on a second domain, providing the global identifier associated with the user; and a key pair authentication server comprising:
  one or more second processors; and
  a second non-transitory computer-readable medium having second processor-executable instructions stored thereon, wherein the second processor-executable instructions, when executed by the one or more second processors, facilitate:
    subsequent to the first user request and based on determining the global identifier associated with the user does not exist within the key pair authentication server, enrolling the user in the key pair authentication, wherein the enrolling comprises:
      redirecting the user device from the first domain to an authentication domain;
      receiving, from the user device, a signed challenge and a public key of a public-private key pair associated with the authentication domain, wherein the signed challenge is signed using a private key of the public-private key pair;
      validating the signed challenge using the public key of the public-private key pair;
      storing the public key as a valid key responsive to successful verification of the public key; and
      enrolling the user in the key pair authentication based on the signed challenge and binding the public key with the global identifier;
    subsequent to the second user request and based on the enrollment of the user into the key pair authentication, determining that the public key is bound to the global identifier;
    in response to determining that the public key is bound to the global identifier, providing instructions to redirect the user device to the authentication domain;
    performing the key pair authentication with the user device for the second domain using the public key of the public-private key pair for the authentication domain; and
    providing a signed JSON web token (JWT) for accessing the different content on the second domain.

10. The system of claim 9, wherein the key pair authentication server is a fast identity online (FIDO) server.

11. The system of claim 9, wherein the second processor-executable instructions, when executed by the one or more second processors, further facilitate providing a challenge to the user device by:
  providing, to the user device, the challenge and allowed authenticators.

12. The system of claim 11, wherein the second processor-executable instructions, when executed by the one or more second processors, further facilitate providing the allowed authenticators by providing one or more biometric requests to the user device, wherein the biometric requests request a biometric marker associated with the user.

13. The system of claim 11, wherein the second processor-executable instructions, when executed by the one or more second processors, further facilitate:
  based on enrolling the user in the key pair authentication, providing a signed JSON web token (JWT) for accessing the content on the first domain.

14. A user device comprising:
  one or more processors; and
  a non-transitory computer-readable medium having processor-executable instructions stored thereon, wherein the processor-executable instructions, when executed, facilitate:
    in response to a user request requesting access to content on a first domain, receiving, from a global identifier server, a global identifier based on the user request, wherein the user request comprises a user identifier;
    providing the global identifier to a key pair authentication server;
    enrolling a user into key pair authentication in response to determining that the global identifier associated with the user does not exist within the key pair authentication server, wherein the enrolling comprises:
      after redirecting the user device from the first domain to an authentication domain, generating a public-private key pair for the authentication domain;
      signing a challenge for the key pair authentication server using a private key of the public-private key pair to obtain a signed challenge;
      providing the signed challenge and a public key of the public-private key pair to the key pair authentication server, wherein the user is enrolled into the key pair authentication based on the signed challenge and binding the public key of the public-private key pair with the global identifier, and wherein the key pair authentication server validates the signed challenge using the public key of the public-private key pair and stores the public key as a valid key;
    receiving a signed JSON web token (JWT) from the key pair authentication server;
    accessing the content on the first domain based on enrolling the user into the key pair authentication and trading the signed JWT for a valid OpenID Connect (OIDC) token with a resource manager server, wherein the valid OIDC token is used to access the content on the first domain;
    requesting access for a different content on a second domain;
    in response to the requesting access for the different content on the second domain, receiving, from the global identifier server, the global identifier;
    in response to determining that the public key was bound to the global identifier during the enrollment of the user into the key pair authentication for the first domain, redirecting a browser from the second domain to the authentication domain; and
    accessing the different content on the second domain based on performing the key pair authentication with the key pair authentication server using the public-private key pair for the authentication domain.

15. The user device of claim 14, wherein the processor-executable instructions, when executed by the one or more processors, further facilitate:
  redirecting the browser from the first domain to the authentication domain based on authenticating user credentials for the first domain, and wherein the key pair authentication server is a fast identity online (FIDO) server.

* * * * *